(12) United States Patent
Martin

(10) Patent No.: US 7,016,344 B1
(45) Date of Patent: Mar. 21, 2006

(54) TIME SLOT INTERCHANGING OF TIME SLOTS FROM MULTIPLE SONET SIGNALS WITHOUT FIRST PASSING THE SIGNALS THROUGH POINTER PROCESSORS TO SYNCHRONIZE THEM TO A COMMON CLOCK

(75) Inventor: Gary D. Martin, North Andover, MA (US)

(73) Assignee: Applied Micro Circuits Corporation, Andover, MA (US)

( * ) Notice: Subject to any disclaimer, the term of this patent is extended or adjusted under 35 U.S.C. 154(b) by 952 days.

(21) Appl. No.: 09/836,777

(22) Filed: Apr. 17, 2001

(51) Int. Cl.
*H04L 12/50* (2006.01)

(52) U.S. Cl. .................... 370/359; 370/537; 370/538; 370/539; 370/540; 370/544; 370/907; 370/419; 370/458; 370/395.7; 375/354; 375/371; 327/144; 327/153

(58) Field of Classification Search ................ 370/907, 370/68, 538, 539, 540, 544, 359, 537, 419, 370/458, 395.7; 375/354, 371; 327/144, 327/153
See application file for complete search history.

(56) References Cited

U.S. PATENT DOCUMENTS

| | | | |
|---|---|---|---|
| 5,812,951 A * | 9/1998 | Ganesan et al. ............ 455/445 |
| 5,841,771 A * | 11/1998 | Irwin et al. ................. 370/360 |
| 6,188,692 B1 * | 2/2001 | Huscroft et al. ........ 370/395.51 |
| 6,233,234 B1 * | 5/2001 | Curry et al. ................ 370/356 |
| 6,738,395 B1 * | 5/2004 | Diaconescu et al. ........ 370/517 |
| 6,778,550 B1 * | 8/2004 | Blahut ........................ 370/443 |
| 2002/0080812 A1 * | 6/2002 | Stadler et al. .............. 370/442 |

* cited by examiner

*Primary Examiner*—Wellington Chin
*Assistant Examiner*—Kevin Mew
(74) *Attorney, Agent, or Firm*—Weingarten, Schurgin, Gagnebin & Lebovici LLP

(57) ABSTRACT

A SONET multiplexed system architecture that permits greater levels of integration. The architecture includes a time slot interchanger for routing information from at least one SONET input signal path associated with a respective first time slot to at least one SONET output signal path associated with a respective second time slot. Each input signal path includes a pointer interpreter, and each output signal path includes a FIFO buffer serially coupled to a pointer generator. The architecture further includes a synchronization buffer in each input signal path for transferring the input signal to the clock rate of the time slot interchanger. The architecture permits greater levels of integration when the time slot interchanger has more inputs than outputs, and/or the time slot interchanger provides the output signal to a pointer processor to transfer the output signal to the clock rate of the output signal path.

12 Claims, 5 Drawing Sheets

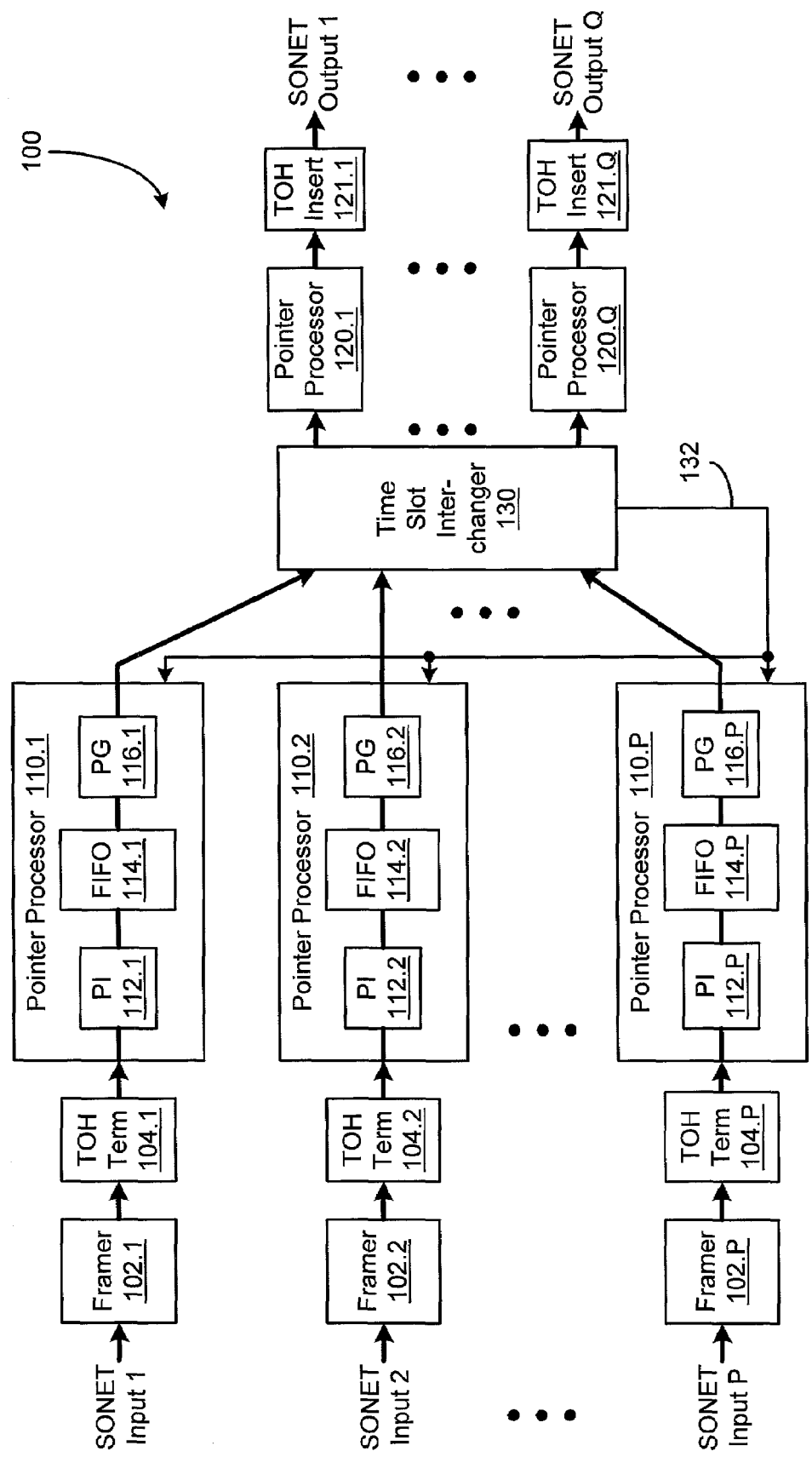

TIME SLOT INTERCHANGING OF TIME SLOTS FROM MULTIPLE SONET SIGNALS WITHOUT FIRST PASSING THE SIGNALS THROUGH POINTER PROCESSORS TO SYNCHRONIZE THEM TO A COMMON CLOCK

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to the multiplexing of digital information in communications systems, and more specifically to a SONET multiplexed communications system having an architecture that permits greater levels of integration.

Synchronous Optical NETwork (SONET) multiplexed communications systems are known that employ time division multiplex switching techniques to route digital information between a plurality of communications paths. An architecture of a conventional SONET multiplexed communications system includes at least one Time Slot Interchanger (TSI) that receives digital information contained in respective time slots from a plurality of SONET input signal paths. The TSI temporarily stores the digital information received during each time slot, and subsequently retransmits that information during another time slot associated with at least one SONET output signal path. In this way, the TSI operates as a cross-switch to route digital information from a SONET input signal path associated with a first time slot to at least one SONET output signal path associated with a second time slot.

In the conventional SONET multiplexed system, the SONET input signal paths may operate at clock rates that are different from the clock rates of the TSI and/or the SONET output signal paths. Further, transport overhead information included in the digital information of SONET output signals may be placed in locations that are different from the transport overhead information included in corresponding SONET input signals. For at least these reasons, pointer processors typically included in the SONET signal paths comprise respective First-In First-Out (FIFO) buffers to compensate for timing variations in the SONET input and output signals that may result from the different clock rates of the SONET input and output signal paths and the different locations of the transport overhead information included in the SONET input and output signals.

One drawback of the conventional SONET multiplexed system is that a significant amount of logic circuitry is required to implement the respective pointer processors in the SONET signal paths. This can be problematic when implementing SONET multiplexed systems on integrated circuits because increased amounts of logic circuitry mean increased die sizes, which can increase manufacturing costs.

It would therefore be desirable to have a SONET multiplexed system for routing digital information between a plurality of SONET input signal paths and a plurality of SONET output signal paths. Such a SONET multiplexed system would have an architecture permitting greater levels of integration.

BRIEF SUMMARY OF THE INVENTION

In accordance with the present invention, a SONET multiplexed system architecture is provided that permits greater levels of integration. The SONET multiplexed system architecture achieves such increased integration levels by employing a synchronization buffer in each SONET input signal path and a first-in first-out buffer in each SONET output signal path to compensate for timing variations in SONET input and output signals.

The SONET multiplexed system architecture includes at least one time slot interchanger configured to route information from at least one SONET input signal path associated with a respective first time slot to at least one SONET output signal path associated with a respective second time slot. In a first embodiment, each SONET input signal path includes a pointer interpreter serially coupled to a synchronization buffer that is configured to compensate for timing variations in the SONET input and output signals resulting from different clock rates of corresponding SONET input and output signal paths, and each SONET output signal path includes a first-in first-out buffer serially coupled to a pointer generator. The first-in first-out buffer is configured at least in part to compensate for timing variations in the SONET input and output signals resulting from different locations of transport overhead information included in the SONET input and output signals.

In the first embodiment, the pointer interpreter precedes the synchronization buffer in each SONET input signal path. In a second embodiment, the synchronization buffer precedes the pointer interpreter in each SONET input signal path. In a third embodiment, each SONET input signal path includes a synchronization buffer, and each SONET output signal path includes a pointer processor comprising a pointer interpreter, a first-in first-out buffer, and a pointer generator.

In a preferred embodiment, each SONET input signal path further includes an alignment buffer that is serially coupled between the synchronization buffer and the time slot interchanger and configured to perform column alignment on SONET input signals formatted in STS-M frames.

The SONET multiplexed system architecture disclosed herein permits greater integration when (1) the time slot interchanger has more inputs than outputs, and/or (2) the time slot interchanger provides each SONET output signal to a pointer processor included in an appropriate SONET output signal path to transfer the SONET output signal to the clock rate of the SONET output signal path.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 1 is a block diagram of an architecture of a conventional SONET multiplexed communications system;

FIG. 2b is a block diagram of an alignment buffer included in the SONET multiplexed communications system architecture of FIG. 2a;

FIG. 3 is a block diagram of a first alternative embodiment of the system architecture depicted in FIG. 2a; and FIG. 4 is a block diagram of a second alternative embodiment of the system architecture depicted in FIG. 2a.

DETAILED DESCRIPTION OF THE INVENTION

Figure 2A:
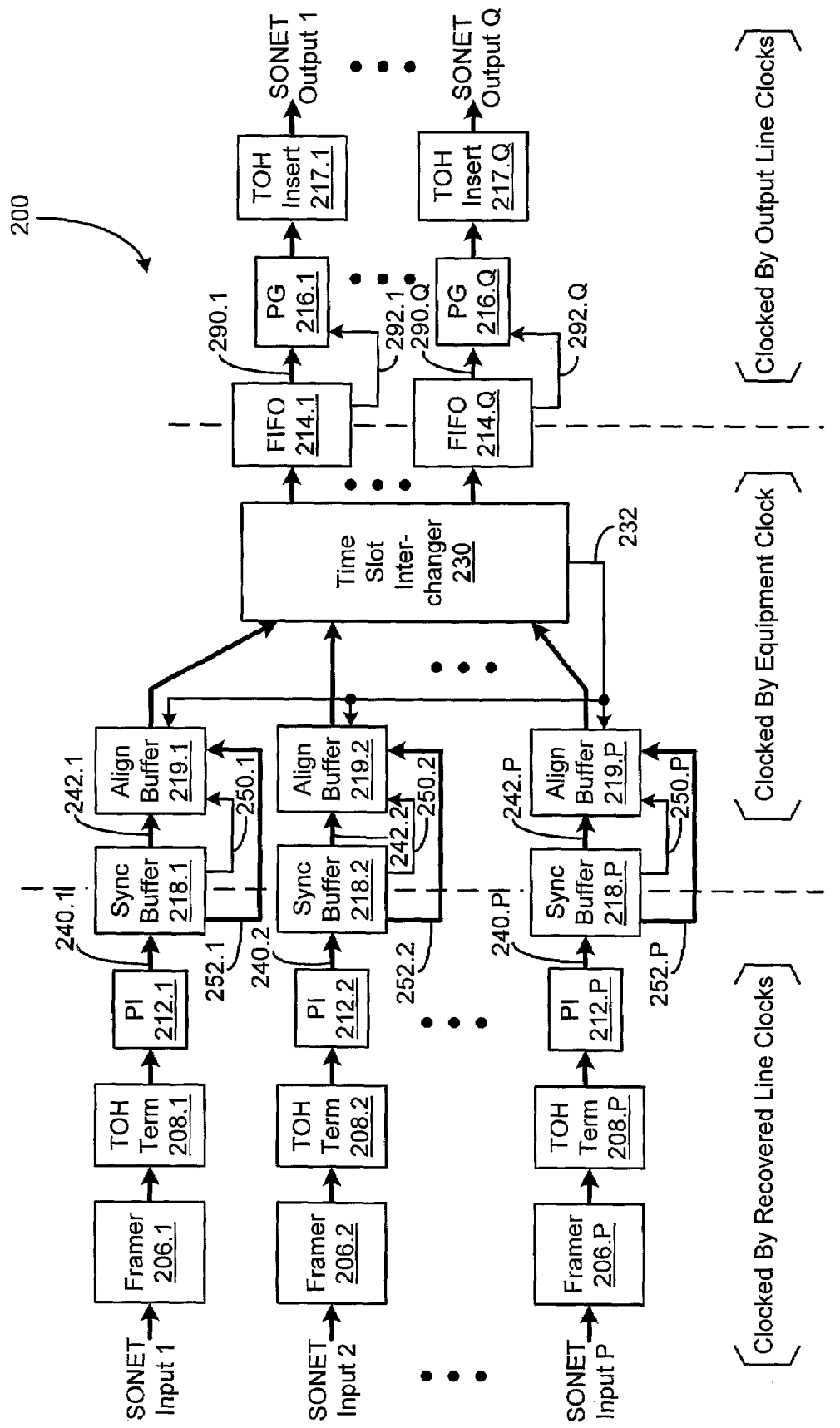
FIG. 2a is a block diagram of an architecture of a SONET multiplexed communications system according to the present invention.

An architecture of a Synchronous Optical NETwork (SONET) multiplexed communications system is disclosed. The presently disclosed invention routes digital information between a plurality of SONET input signal paths and a plurality of SONET output signal paths by way of a system architecture that permits greater levels of integration.

SONET is a set of standards for synchronous data transmission over fiber optic networks published by the American National Standards Institute (ANSI). Synchronous Digital Hierarchy (SDH) is the international version of such standards for synchronous data transmission published by the International Telecommunications Union (ITU). It should be understood that the presently disclosed invention may be implemented according to either the SONET Standard or the SDH Standard. The presently disclosed invention is described herein with reference to the SONET Standard for purposes of illustration.

According to the SONET Standard, electronic signals are formatted in Synchronous Transport Signal (STS) frames. Specifically, a basic STS-1 frame comprises nine (9) rows of bytes by ninety (90) columns of bytes. The first three (3) columns of the STS-1 frame contain Transport OverHead (TOH) bytes, and the remaining eighty-seven (87) columns contain Synchronous Payload Envelope (SPE) bytes. The eighty-seven (87) columns of SPE bytes include one (1) column of Path OverHead (POH) bytes, two (2) columns of fixed "stuff" bytes, and eighty-four (84) columns of payload data bytes. Each row of the STS-1 frame therefore typically includes three (3) TOH bytes, one (1) POH byte, two (2) fixed stuff bytes, and eighty-four (84) payload data bytes. It is noted that the first row of the STS-1 frame includes the TOH bytes A1 and A2, which form a framing pattern of bits indicative of the start of the frame. It is further noted that the fourth row of the STS-1 frame includes the TOH bytes H1, H2, and H3. The H1H2 bytes comprise a pointer to the start of the SPE bytes of the STS-1 frame, and the H3 byte comprises a positive/negative justification byte. Specifically, for positive justification of a SONET output signal relative to a SONET input signal, the fourth row includes an additional stuff byte following the H3 byte that replaces the POH byte or one of the eighty-four (84) payload data bytes. For example, in the event the additional stuff byte replaces the POH byte, the fourth row may include the three (3) TOH bytes (H1, H2, and H3), the additional stuff byte that replaces the POH byte, the two (2) fixed stuff bytes, and the eighty-four (84) payload data bytes. For negative justification of a SONET output signal relative to a SONET input signal, the fourth row includes an additional POH byte or an additional payload data byte in the H3 byte position. For example, in the event that an additional POH byte is in the H3 byte position, the fourth row may include the two (2) TOH bytes (H1 and H2), the additional POH byte in the H3 byte position, the POH byte in the normal POH byte position, the two (2) fixed stuff bytes, and the eighty-four (84) payload data bytes.

Like the basic STS-1 frame, a concatenated STS-Nc frame comprises nine (9) rows of bytes. Each row of the STS-Nc frame typically includes three (3) N-byte columns of TOH bytes, and eighty-seven (87) N-byte columns of SPE bytes. The first column of the SPE bytes contains one (1) POH byte, [(N/3)−1] fixed stuff bytes, and 2N/3 payload data bytes; and, each of the remaining eighty-six (86) columns of the SPE bytes contains N payload data bytes. Further, the first row of the STS-Nc frame includes the above-mentioned TOH bytes A1 and A2, and the fourth row of the STS-Nc frame includes N groups of TOH bytes H1, H2, and H3. For positive justification of a SONET output signal relative to a SONET input signal, the fourth row includes N respective additional stuff bytes following the N H3 bytes, and 86N SPE bytes. For negative justification of a SONET output signal relative to a SONET input signal, the fourth row includes N respective additional SPE bytes in the N H3 byte positions to produce 88N SPE bytes.

It is noted that M (M>1) STS-1 tributaries may be multiplexed together to form a single STS-M frame by, e.g., interleaving the STS-1 tributaries one byte at a time. Each row of the resulting STS-M frame typically includes eighty-seven (87) columns of SPE bytes, in which each column includes M time slots of one (1) byte each for each one of the M STS-1 tributaries. It is further noted that an STS-M frame may contain a combination of multiplexed STS-1 tributaries and/or STS-Nc tributaries, in which N≦M.

FIG. 1 depicts a block diagram of a conventional SONET multiplexed system architecture 100 configured for routing digital information between a plurality of SONET input signal paths 1–P and a plurality of SONET output signal paths 1–Q, in which P may or may not be equal to Q. The conventional SONET multiplexed system architecture 100 includes a Time Slot Interchanger (TSI) 130, which receives digital information contained in respective time slots from the plurality of SONET input signal paths 1–P. The TSI 130 temporarily stores the digital information received in each time slot, and subsequently retransmits that information during another time slot associated with one of the SONET output signal paths 1–Q. For example, the TSI 130 may be used as a cross-switch to route information from communications equipment coupled to one of the SONET input signal paths 1–P associated with a first time slot to other communications equipment coupled to one of the SONET output signal paths 1–Q associated with a second time slot.

Because the SONET input signal paths 1–P of FIG. 1 may operate at clock rates that are different from the clock rates employed by the TSI 130 and/or the SONET output signal paths 1–Q, the SONET input signal paths 1–P include respective pointer processors 110.1–110.P configured at least in part to transfer the respective SONET input signals 1–P to the clock rate of the TSI 130. Specifically, the SONET input signal path 1 includes a framer circuit 102.1, a TOH termination circuit 104.1, and the pointer processor 110.1; the SONET input signal path 2 includes a framer circuit 102.2, a TOH termination circuit 104.2, and the pointer processor 110.2; and, the SONET input signal path P includes a framer circuit 102.P, a TOH termination circuit 104.P, and the pointer processor 110.P. More specifically, the pointer processors 110.1–110.P include respective Pointer Interpreters (PI's) 112.1–112.P; respective First-In First-Out (FIFO) memories 114.1–114.P; and, respective Pointer Generators (PG's) 116.1–116.P.

It is noted that the framer circuits 102.1–102.P are typically configured to perform byte alignment on incoming STS frames. Moreover, the pointer processors 110.1–110.P are typically configured to perform frame alignment on the incoming frames. For this reason, the TSI 130 may include control circuitry (not shown) configured for generating a frame sync pulse, which is typically asserted at a rate of 1 pulse/frame. The TSI 130 provides the frame sync pulse to the pointer processors 110.1–110.P by way of a line 132 for use in performing frame alignment. It is understood that the frame sync pulse may alternatively be provided by way of external independent control.

Because the clock rate employed by the TSI 130 may be different from the clock rates employed by the SONET output signal paths 1–Q of FIG. 1, the SONET output signal paths 1–Q include respective pointer processors 120.1–120.Q configured at least in part to transfer the signals provided by the TSI 130 to the clock rates of the SONET output signal paths 1–Q. Specifically, the SONET output signal path 1 includes the pointer processor 120.1 and a TOH insertion circuit 121.1, and the SONET output signal path Q includes the pointer processor 120.Q and a TOH insertion circuit 121.Q. It should be appreciated that each of the pointer processors 110.1–110.P and 120.1–120.Q includes a significant amount of logic circuitry, which can be problematic when implementing the architecture 100 of the conventional SONET multiplexed system on an integrated circuit.

FIG. 2a depicts a block diagram of an illustrative embodiment of a SONET multiplexed system architecture 200 in accordance with the present invention. The exemplary SONET multiplexed system architecture 200 provides for the routing of digital information from a plurality of SONET input signal paths 1–P to a plurality of SONET output signal paths 1–Q using time division multiplex switching techniques. In a preferred embodiment, in which P>Q, the architecture 200 of the SONET multiplexed system permits greater levels of integration.

In the illustrated embodiment, the SONET multiplexed system architecture 200 includes a Time Slot Interchanger (TSI) 230. As in the conventional architecture 100 (see FIG. 1), the TSI 230 receives digital information contained in respective time slots from the plurality of SONET input signal paths 1–P, temporarily stores the digital information received in each time slot, and then retransmits that information during another time slot associated with one of the SONET output signal paths 1–Q. The TSI 230 therefore functions as a cross-switch to route information from communications equipment coupled to one of the SONET input signal paths 1–P associated with a first time slot to other communications equipment coupled to one of the SONET output signal paths 1–Q associated with a second time slot.

It is noted that the clock rates employed by the respective SONET input signal paths 1–P of FIG. 2a correspond to the clock rates of recovered line clocks on the respective SONET input signal paths 1–P, and the clock rate employed by the TSI 230 corresponds to the clock rate of the communications equipment ("the equipment clock").

Because the clock rates employed by the respective SONET input signal paths 1–P may be different from the clock rate employed by the TSI 230, the SONET input signal paths 1–P include respective Pointer Interpreters (PI's) 212.1–212.P serially coupled to respective synchronization buffers 218.1–218.P ("sync buffers") that are configured to transfer the SONET input signals 1–P to the clock rate of the TSI 230. Specifically, the SONET input signal path 1 includes a framer circuit 206.1, a TOH termination circuit 208.1, the PI 212.1, the sync buffer 218.1, and an alignment buffer 219.1; the SONET input signal path 2 includes a framer circuit 206.2, a TOH termination circuit 208.2, the PI 212.2, the sync buffer 218.2, and an alignment buffer 219.2; and, the SONET input signal path P includes a framer circuit 206.P, a TOH termination circuit 208.P, the PI 212.P, the sync buffer 218.P, and an alignment buffer 219.P.

The framer circuits 206.1–206.P are clocked by the respective recovered line clocks, and configured to detect A1A2 and H1H2 bytes in SONET input signals and separate the serial data in the SONET input signals into bytes (i.e., perform byte alignment). The TOH termination circuits 208.1–208.P are clocked by the respective recovered line clocks, and configured to detect the TOH bytes in the SONET input signals and remove all of them except for the fourth row of TOH bytes (i.e., the bytes H1, H2, and H3). The PI's 212.1–212.P are clocked by the respective recovered line clocks, and configured to interpret the H1H2 bytes to determine the pointer of the trace byte (i.e., the J1 byte) pointing to the start of the SPE bytes, thereby determining the respective locations of the POH bytes, the fixed stuff bytes, and the payload data bytes in the SONET input signals. The inputs of the sync buffers 218.1–218.P are clocked by the respective recovered line clocks, and the outputs of the sync buffers 218.1–218.P are clocked by the equipment clock. The alignment buffers 219.1–219.P are clocked by the equipment clock, and configured to perform column alignment on SONET input signals formatted in STS-M frames.

It is noted that the TSI 230 may include control circuitry (not shown) configured for generating a column sync pulse, which is asserted at a rate of 1 pulse/M clock cycles. The TSI 230 provides the column sync pulse to the alignment buffers 219.1–219.P by way of a line 232 for use in performing column alignment. It is understood that the column sync pulse may alternatively be provided by way of external independent control.

It is further noted that the position of the PI relative to the sync buffer in each of the SONET input signal paths 1–P and the TSI 230 not only determines what frame information is to be provided to the respective sync buffers, but also the configuration of the sync buffers. Whether the SONET input signals are formatted in STS-1 frames or STS-M frames is also determinative of what frame information is to be provided to the respective sync buffers and the sync buffer configuration.

In the SONET multiplexed system architecture 200 (see FIG. 2a), the PI is positioned before the sync buffer in each of the SONET input signal paths 1–P. Specifically, the PI 212.1 is positioned before the sync buffer 218.1 in the SONET input signal path 1, the PI 212.2 is positioned before the sync buffer 218.2 in the SONET input signal path 2, and the PI 212.P is positioned before the sync buffer 218.P in the SONET input signal path P. As a result, the PI's 212.1–212.P interpret the H1H2 bytes to determine the locations of the POH bytes, the fixed stuff bytes, and the payload data bytes in the respective SONET input signals before the PI's 212.1–212.P provide any frame information to the respective sync buffers 218.1–218P. In the event the SONET input signals are formatted in STS-1 frames, the PI's 212.1–212.P then provide the POH bytes, the payload data bytes, a single bit to identify the byte type (i.e., POH or payload data), and the H3 bytes (which may be used to perform positive/negative justification) to the respective sync buffers 218.1–218.P by way of buses 240.1–240.P. In the event the SONET input signals are formatted in STS-Nc frames, the PI's 212.1–212.P provide the POH bytes, the payload data bytes, and the H3 bytes to the respective sync buffers 218.1–218.P by way of the buses 240.1–240.P. It is noted that the PI's 212.1–212.P optionally provide the [(N/3)−1] fixed stuff bytes contained in the first column of the SPE bytes of the STS-Nc frames to the respective sync buffers 218.1–218.P. Because the [(N/3)−1] fixed stuff bytes have fixed locations in the STS-Nc frames, these bytes may be either directly provided to the sync buffers 218.1–218.P or recreated and inserted in the STS-Nc frames after the sync buffers.

As described above, the TOH termination circuits 208.1–208.P are configured to remove all of the TOH bytes from the respective SONET input signals with the exception of the H1H2 bytes (which are interpreted by the PI's 212.1–212.P) and the H3 byte in the fourth row. As a result, except for the H3 bytes, none of the TOH bytes in the SONET input signals are provided to the respective sync buffers 218.1–218.P. This means that for each of the SONET input signal paths 1–P, the active data rate at the output of the respective sync buffer is less than the data rate at the input of the sync buffer, which permits the clock rate of the equipment clock to be less than that of the recovered line clocks.

The recovered line clocks are employed by the respective sync buffers 218.1–218.P for their inputs, and the equipment clock is employed by the respective sync buffers 218.1–218.P for their outputs. The recovered line clocks are therefore used to write bytes into the respective sync buffers 218.1–218.P, and the equipment clock is used to read bytes from the respective sync buffers 218.1–218.P. As bytes are being read from the respective sync buffers 218.1–218.P, each sync buffer 218.1–218.P enters an "inactive" state for the period corresponding to the removed TOH bytes. Further, each sync buffer 218.1–218.P provides an indication of being in the inactive state to the alignment buffer serially coupled thereto. Specifically, the sync buffer 218.1 provides an inactive state indication to the alignment buffer 219.1 on a line 250.1, the sync buffer 218.2 provides an inactive state indication to the alignment buffer 219.2 on a line 250.2, and the sync buffer 218.P provides an inactive state indication to the alignment buffer 219.P on a line 250.P.

Moreover, as described above, the alignment buffers 219.1–219.P are configured to perform column alignment on SONET input signals formatted in STS-M frames. Further, each column of SPE bytes in an STS-M frame includes M times slots. Accordingly, in the event the SONET input signals are formatted in STS-M frames, each sync buffer 218.1–218.P provides indications of the M time slots to the alignment buffer serially coupled thereto for use in performing column alignment on the STS-M frames.

Specifically, the sync buffer 218.1 provides time slot indications to the alignment buffer 219.1 on a bus 252.1, the sync buffer 218.2 provides time slot indications to the alignment buffer 219.2 on a bus 252.2, and the sync buffer 218.P provides time slot indications to the alignment buffer 219.P on a bus 252.P. The sync buffers 218.1–218.P indicate the respective time slots to the alignment buffers 219.1–219.P by consecutively counting on the buses 252.1–252.P from 1 to M as SPE bytes are being read from the sync buffers 218.1–218.P.

It is noted that in the event the recovered line clock employed by the sync buffers 218.1–218.P for their inputs corresponds to the SONET line rate (e.g., 51.84 MHz for STS-1 frames, 155.52 MHz for STS-3 frames, etc.), the sync buffers 218.1–218.P further provide respective bit indications (not shown) to the alignment buffers 219.1–219.P for use in distinguishing the 8 bits of each byte of the incoming frames. In a preferred embodiment, the sync buffers 218.1–218.P are configured to operate on complete bytes, and therefore lines providing the bit indications from the sync buffers 218.1–218.P to the alignment buffers 219.1–219.P are omitted from the illustrated embodiment.

The operation of the sync buffers 218.1–218.P included in the SONET multiplexed system architecture 200 of FIG. 2a will be better understood with reference to the following first illustrative example. In this first example, the SONET input signals are formatted in STS-1 frames. Further, it should be appreciated that the minimum free run accuracy of a SONET Minimum Clock is on the order of ±20 PPM. Accordingly, the largest possible frequency difference between the clock rate of the recovered line clock and the clock rate of the equipment clock is 40 PPM or less.

In this first illustrative example, the recovered line clock is used to write bytes into the sync buffer 218.1, and the equipment clock is used to read bytes from the sync buffer 218.1. Further, the recovered line clock rate is 40 PPM greater than the equipment clock rate. Accordingly, while bytes are being simultaneously written into and read from the sync buffer 218.1, the sync buffer 218.1 accumulates one (1) extra byte for every 25 k bytes written.

Specifically, for each row of an incoming STS-1 frame, the recovered line clock is used to write eighty-seven (87) SPE bytes into the sync buffer 218.1, and the equipment clock is used to read the SPE bytes from the sync buffer 218.1. The writing of bytes into the sync buffer 218.1 then stops for the period corresponding to the three (3) TOH bytes in the next row, which were removed by the TOH termination circuit 208.1. Although the writing of bytes into the sync buffer 218.1 stops, the equipment clock continues to be used to read the SPE bytes from the sync buffer 218.1 until the sync buffer 218.1 is empty. The reading of bytes from the sync buffer 218.1 then stops for the period corresponding to the three (3) removed TOH bytes. During that period, the sync buffer 218.1 enters the inactive state and asserts the inactive state indication on the line 250.1. When the recovered line clock is again used to write bytes into the sync buffer 218.1, i.e., at the beginning of the SPE in the next row of the STS-1 frame, there is typically a delay before the sync buffer 218.1 exits the inactive state and the equipment clock is again used to read the SPE bytes from the sync buffer 218.1. In a preferred embodiment, this delay allows 1–3 bytes to accumulate in the sync buffer 218.1. This level of 1–3 bytes accumulated in the sync buffer 218.1 remains relatively constant during the subsequent reading of the SPE bytes from and writing of the SPE bytes into the sync buffer 218.1. The writing of bytes into the sync buffer 218.1 then stops for the period corresponding to the three (3) removed TOH bytes in the next row of the STS-1 frame, and the cycle repeats.

It should be noted that after the eighty-seven (87) SPE bytes of the third row of the incoming STS-1 frame are written into the sync buffer 218.1, the recovered line clock is used to write the H3 byte of the fourth row (if a negative justification has occurred) and the eighty-seven (87) SPE bytes of the fourth row into the sync buffer 218.1. Such writing of the bytes included in the third and fourth rows of an STS-1 frame results in 175 bytes being written into the sync buffer 218.1. During the period when these 175 bytes are being written into the sync buffer 218.1, the frequency difference between the recovered line clock and the equipment clock can cause the level of 1–3 bytes accumulated in the sync buffer 218.1 to increase by a fraction of a bit. Accordingly, for systems comprising clocks that operate at the byte rate of incoming frames, the sync buffer 218.1 is preferably configured to provide four (4) clock cycles worth of buffering.

Because of the frequency difference between the recovered line clock rate and the equipment clock rate, the number of bytes read from the sync buffers 218.1–218.P during the period when a complete STS-1 frame is being read can vary by +1 byte. This can be problematic when the SONET input signals are formatted in STS-M frames because such a variation can cause STS-1 and/or STS-Nc tributaries included in the STS-M frames to be altered as the tributaries pass through the TSI 230. Accordingly, the alignment buffers 219.1–219.P are configured to perform column alignment on each incoming STS-M frame to ensure that the TSI 230 places each group of M time slots in a single SPE column of the incoming STS-M frame into a single SPE column of an appropriate SONET output signal in unaltered order.

As described above, the pointer processors 110.1–110.P included in the SONET input signal paths 1–P of the conventional architecture 100 (see FIG. 1) are typically configured to perform frame alignment on incoming STS frames. As a result, when the first time slot (i.e., row 1-column 1) of an incoming STS-M frame is provided to the TSI 130 by the pointer processor 110.1, the first time slots (i.e., row 1-column 1) of STS-M frames are simultaneously provided to the TSI 130 by the pointer processors 110.2–110.P.

In the SONET multiplexed system architecture 200 (see FIG. 2a), the respective alignment buffers 219.1–219.P are included in the SONET input signal paths 1–P to perform column alignment on SONET input signals formatted in STS-M frames. It is noted that the alignment buffers 219.1–219.P of the illustrated embodiment are typically not configured to perform frame alignment. As a result, when a particular time slot of any column of an incoming STS-M frame is provided to the TSI 230 by the alignment buffer 219.1, the corresponding time slots of respective columns of STS-M frames are simultaneously provided to the TSI 230 by the alignment buffers 219.2–219.P. Because the alignment buffers 219.1–219.P of the illustrated embodiment are typically not configured to perform frame alignment, the corresponding time slots provided to the TSI 230 by the alignment buffers 219.1–219.P may or may not come from the same columns.

Figure 2B:
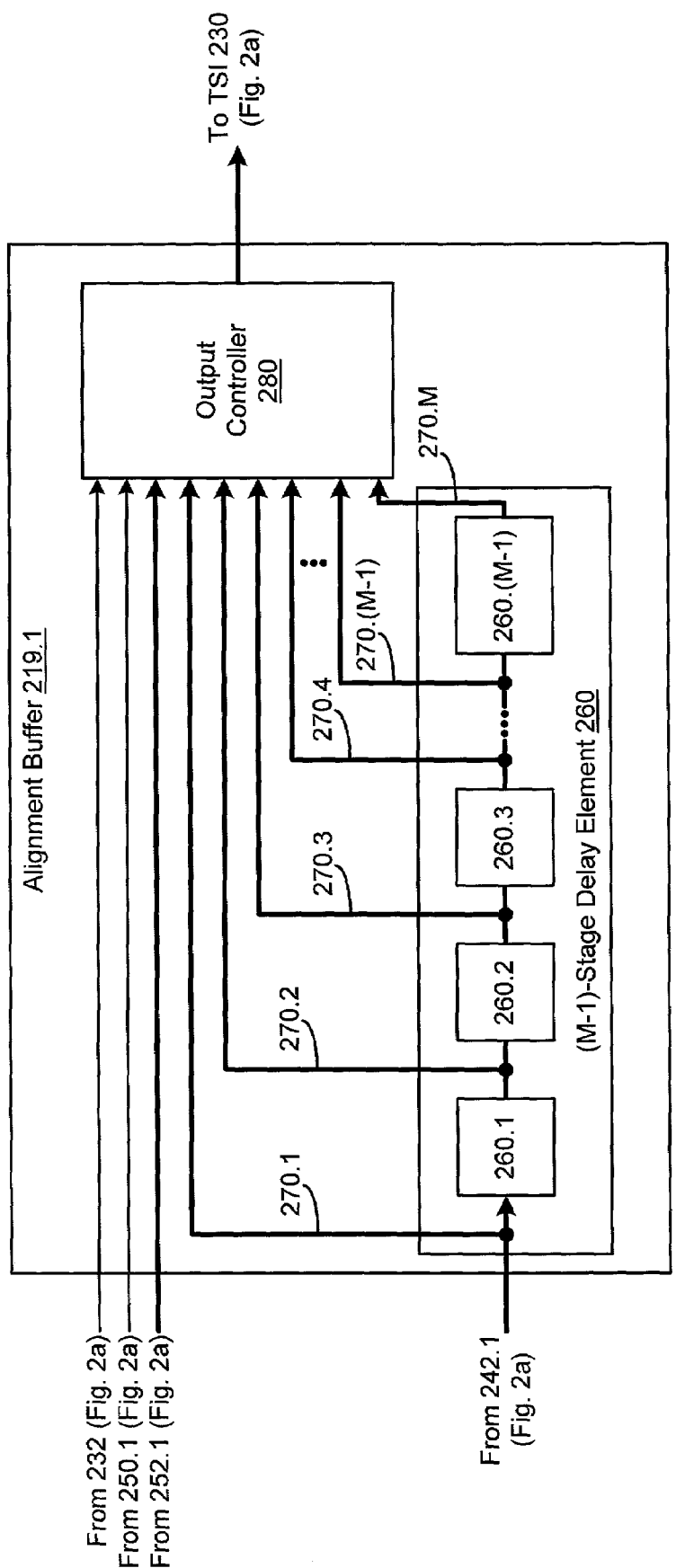

FIG. 2b depicts a block diagram of an illustrative embodiment of the alignment buffer 219.1. It is understood that the configuration of each of the alignment buffers 219.2–219.P is like that of the alignment buffer 219.1 of FIG. 2b. Specifically, the alignment buffer 219.1 includes an (M−1)-stage delay element 260 coupled to an output controller 280 by way of M taps 270.1–270.M. The (M−1)-stage delay element 260 is configured to provide (M−1) time slots 260.1–260.(M−1) of storage for the bytes provided to the alignment buffer 219.1 by the sync buffer 218.1 on the bus 242.1. Further, the column sync pulse is provided to the output controller 280 by way of the line 232, the inactive state indication is provided to the output controller 280 by way of the line 250.1, and the time slot indication is provided to the output controller 280 by way of the line 252.1.

It should be understood that when the alignment buffer 219.1 performs column alignment on the SONET input signals, the output controller 280 employs the column sync pulse on the line 232 and the time slot indication on the bus 252.1 to adjust the delay through the alignment buffer 219.1 by selecting the taps 270.1–270.M from which to receive the bytes stored in the (M−1)-stage delay element 260. In this way, the alignment buffer 219.1 may add appropriate amounts of delay to the bytes that it provides to the TSI 230, thereby achieving column alignment with the bytes provided to the TSI 230 by the alignment buffers 219.2–219.P.

The operation of the alignment buffer 219.1 (see FIG. 2b) will be better understood with reference to the following second illustrative example. It is understood that each of the alignment buffers 219.2–219.P (see FIG. 2a) operates like the alignment buffer 219.1. In this second example, the SONET input signals are formatted in STS-M frames. Further, the recovered line clock is used to write bytes into the sync buffer 218.1, and the equipment clock is used to read bytes from the sync buffer 218.1. The alignment buffer 219.1 is also clocked by the equipment clock.

Specifically, for each row of an incoming STS-M frame, the recovered line clock is used to write the active bytes, i.e., the SPE bytes, into the sync buffer 218.1, and the equipment clock is used to read the active bytes from the sync buffer 218.1. Further, the sync buffer 218.1 provides indications of the respective time slots in each column of the SPE bytes to the alignment buffer 219.1 by consecutively counting on the bus 252.1 from 1 to M as the active bytes are being read from the sync buffer 218.1. The reading of bytes from the sync buffer 218.1 then stops for the period corresponding to the inactive bytes, i.e., the TOH bytes that were removed by the TOH termination circuit 208.1. During that period, the sync buffer 218.1 enters the inactive state, and asserts the inactive state indication on the line 250.1. Moreover, because of the frequency difference between the recovered line clock rate and the equipment clock rate, the number of time slots that occur during that period may be 0 modulo M, 1 modulo M, or (M−1) modulo M.

More specifically, before the sync buffer 218.1 enters the inactive state, the alignment buffer 219.1 continuously receives the active bytes into the (M−1)-stage delay element 260; and, after appropriate delays of 0 to (M−1) equipment clock cycles, continuously provides the active bytes to the TSI 230. When the first inactive byte appears at the input of the (M−1)-stage delay element 260, the alignment buffer 219.1 enters the inactive state after a delay of 0 to (M−1) equipment clock cycles, depending on which tap 270.1–270.M is selected by the output controller 280. It should be understood that the output controller 280 adjusts the delay through the alignment buffer 219.1 while the alignment buffer 219.1 is in the inactive state so that none of the SPE bytes are inadvertently lost.

In this second example, in the event the output controller 280 determines that the alignment buffer 219.1 is inactive for an integer multiple of M equipment clock cycles, the output controller 280 makes no adjustment to the delay through the alignment buffer 219.1. In the event it is determined that the alignment buffer 219.1 is inactive for 1 modulo M equipment clock cycles, the output controller 280 accesses the (M−1)-stage delay element 260 by way of a suitable tap so as to decrease the delay through the alignment buffer 219.1 by 1 modulo (M−1) to compensate. In the event it is determined that the alignment buffer 219.1 is inactive for (M−1) modulo M equipment clock cycles, the output controller 280 accesses the (M−1)-stage delay element 260 by way of a suitable tap so as to increase the delay through the alignment buffer 219.1 by 1 modulo (M−1) to compensate. In this way, the alignment buffer 219.1 maintains column alignment of STS-M frames provided to the TSI 230.

In the illustrated embodiment, the SONET output signal path 1 includes a FIFO buffer 214.1, a PG 216.1, and a TOH insertion circuit 217.1; and, the SONET output signal path Q includes a FIFO buffer 214.Q, a PG 216.Q, and a TOH insertion circuit 217.Q (see FIG. 2a). Further, the inputs of the FIFO's 214.1–214.Q are clocked by the equipment clock, and the outputs of the FIFO's 214.1–214.Q are clocked by independent line clocks on the respective SONET output signal paths 1–Q. The PG's 216.1–216.Q and the TOH insertion circuits 217.1–217.Q are also clocked by the independent line clocks.

Each of the FIFO's 214.1–214.Q is configured to receive a J1 byte and SPE bytes of an incoming frame from the TSI 230, and provide these bytes to the PG serially coupled thereto by way of buses 290.1–290.Q. The FIFO's 214.1–214.Q further provide "FIFO fill" indications to the respective PG's 216.1–216.Q by way of lines 292.1–292.Q. Each FIFO 214.1–214.Q is configured to hold a plurality of columns of the SPE bytes because the locations of the TOH bytes in outgoing frames generated by the PG's 216.1–216.Q and the TOH insertion circuits 217.1–217.Q may not be coincident with the locations of the TOH bytes in the incoming frames. It is noted that during the periods when bytes are being provided to the respective PG's 216.1–216.Q from the FIFO's 214.1–214.Q, the FIFO's 214.1–214.Q may not be receiving any bytes from the TSI 230.

Each of the PG's 216.1–216.Q is configured to receive bytes from the respective FIFO's 214.1–214.Q, determine outgoing pointer values for the outgoing frames using the J1 byte indications provided on the buses 290.1–290.Q, and perform negative/positive justifications. Specifically, in the event the fill of the FIFO's 214.1–214.Q exceeds predetermined upper and lower threshold values, as indicated on the lines 292.1–292.Q, the PG's perform such negative/positive justifications to allow either more or less space in the outgoing frames for the SPE bytes. In this way, the fill of the FIFO's 214.1–214.Q can be adjusted to be near the center without dropping any SPE bytes. Finally, each TOH termination circuit 208.1–208.Q is configured to receive the outgoing pointer values from the respective PG's 216.1–216.Q and suitably insert TOH bytes in the outgoing frames.

Figure 3:
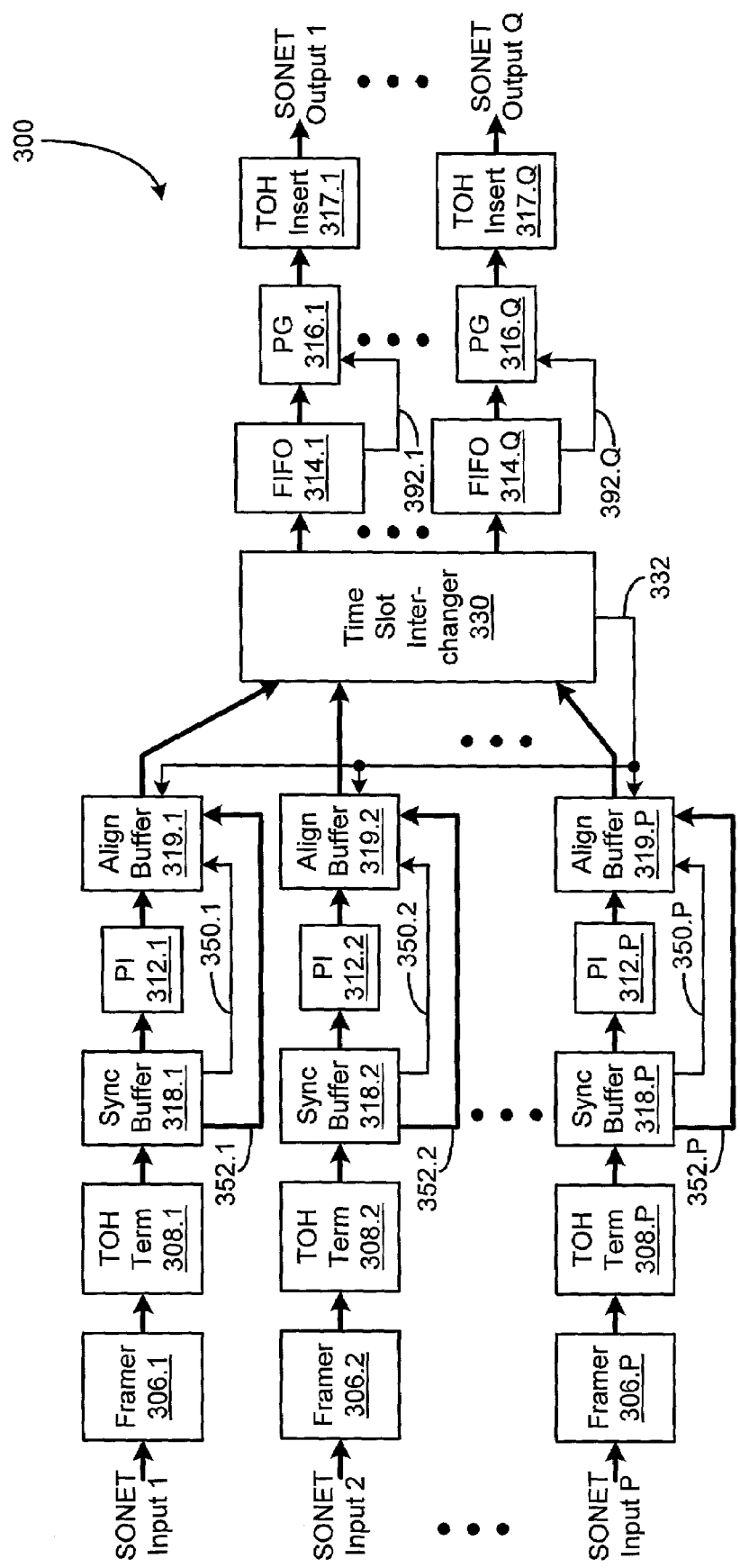

As described above, the position of the PI relative to the sync buffer in each of the SONET input signal paths 1–P and the TSI determines what frame information is provided to the respective sync buffers and the sync buffer configuration. FIG. 3 depicts an exemplary SONET multiplexed system architecture 300, in which the PI's 312.1–312.Q are positioned between the respective sync buffers 318.1–318.P and the TSI 330. Specifically, the PI 312.1 is positioned between the sync buffer 318.1 and the TSI 330, the PI 312.2 is positioned between the sync buffer 318.2 and the TSI 330, and the PI 312.P is positioned between the sync buffer 318.P and the TSI 330. In this embodiment, the locations of the POH bytes, the fixed stuff bytes, and the payload data bytes in the respective SONET input signals are unknown at the inputs of the sync buffers 318.1–318P. Accordingly, the sync buffers 318.1–318.P provide all of the SPE bytes and the TOH bytes H1, H2, and H3 to the respective PI's 312.1–312.P serially coupled thereto. The respective PI's 312.1–312.P then interpret the H1H2 bytes to determine the POH byte, the fixed stuff byte, and the payload data byte locations.

Figure 4:
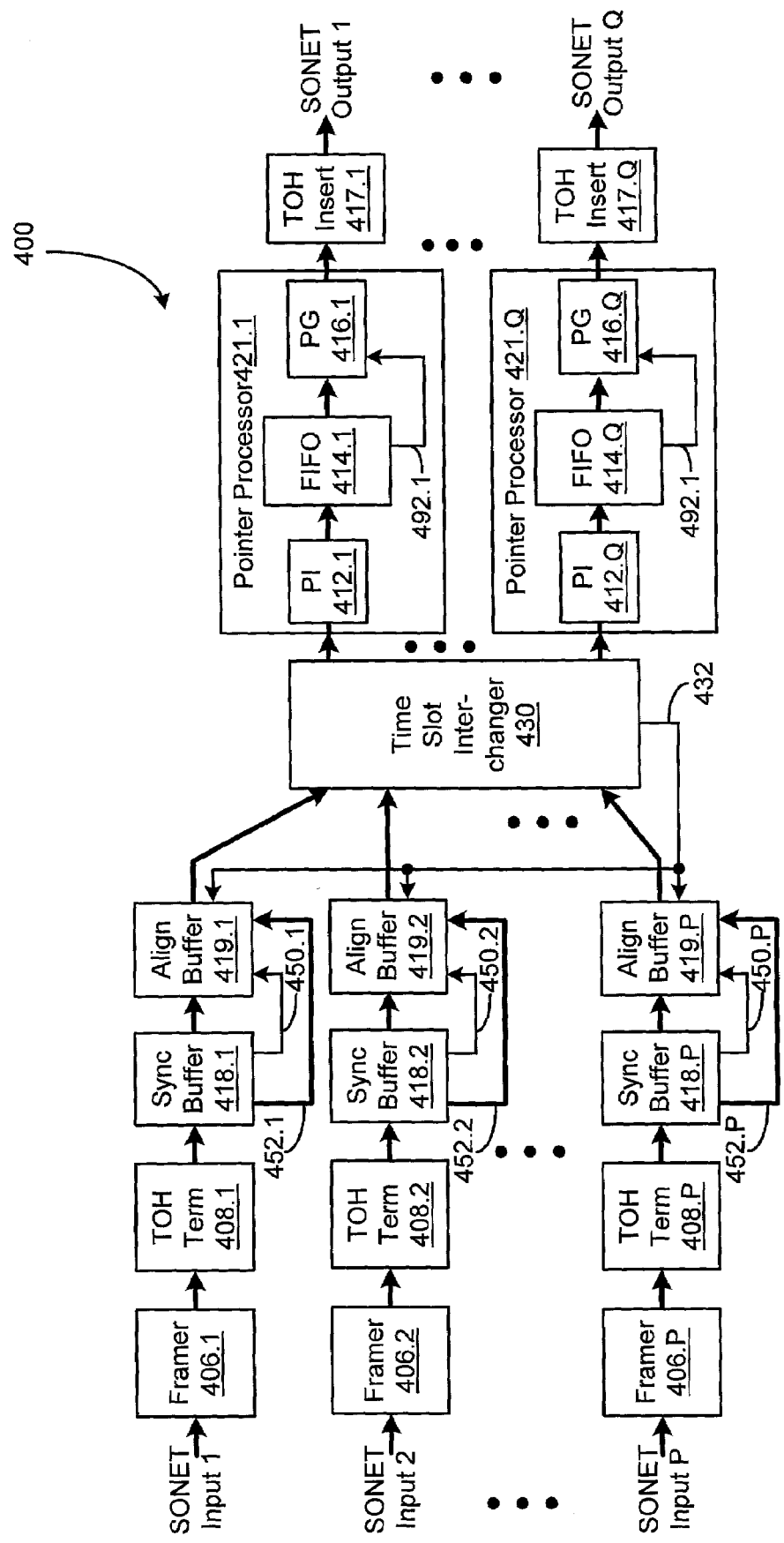

FIG. 4 depicts an exemplary SONET multiplexed system architecture 400, in which the PI's 412.1–412.Q are positioned after the TSI 430. Specifically, the PI 412.1 is included in a pointer processor 421.1 positioned after the TSI 430, and the PI 412.Q is included in a pointer processor 421.Q positioned after the TSI 430. Like the embodiment of FIG. 3, the locations of the POH bytes, the fixed stuff bytes, and the payload data bytes in the respective SONET input signals are unknown at the inputs of the sync buffers 418.1–418P. Accordingly, the sync buffers 418.1–418.P provide all of the SPE bytes and the TOH bytes H1, H2, and H3 to the respective alignment buffers 419.1–419.P serially coupled thereto. The respective PI's 412.1–412.Q subsequently interpret the H1H2 bytes to determine the POH byte, the fixed stuff byte, and the payload data byte locations.

It is noted that for systems comprising clocks that operate at the byte rate of incoming frames, the sync buffers included in the system architectures 300 and 400 are preferably configured to provide more than four (4) clock cycles worth of buffering.

It will be appreciated by those of ordinary skill in the art that modifications to and variations of the above-described SONET multiplexed system architecture may be made without departing from the inventive concepts disclosed herein. Accordingly, the invention should not be viewed as limited except as by the scope and spirit of the appended claims.

What is claimed is:

1. A SONET multiplexed communications system, comprising:

at least one SONET input signal path configured to receive at least one input signal, the SONET input signal path including a pointer interpreter configured to interpret at least one input signal pointer;

at least one SONET output signal path configured to transmit at least one output signal corresponding to the input signal, the SONET output signal path including a pointer generator configured to generate at least one output signal pointer; and a time slot interchange circuit operatively coupled between the pointer interpreter and the pointer generator included in the SONET input and output signal paths, respectively, the time slot interchange circuit being configured to provide time division multiplexed connections for the input and output signals, wherein the SONET input signal path further includes a synchronization buffer serially coupled to the pointer interpreter, the synchronization buffer being configured to transfer the input signal from a respective clock rate of the SONET input signal path to a respective clock rate of the time slot interchange circuit, and wherein the SONET output signal path further includes a first-in first-out buffer serially coupled to the pointer generator, the first-in first-out buffer being configured to transfer the output signal from the respective clock rate of the time slot interchange circuit to a respective clock rate of the SONET output signal path.

2. The system of claim 1 wherein the pointer interpreter precedes the synchronization buffer in the SONET input signal path.

3. The system of claim 1 wherein the synchronization buffer precedes the pointer interpreter in the SONET input signal path.

4. The system of claim 1 wherein the input signal is an STS-M (M>1) signal, and the SONET input signal path further includes an alignment buffer operatively coupled between the synchronization buffer and the time slot interchange circuit and configured to perform column alignment on the STS-M signal.

5. A SONET multiplexed communications system, comprising:

at least one SONET input signal path configured to receive at least one input signal;

at least one SONET output signal path configured to transmit at least one output signal corresponding to the input signal; and a time slot interchange circuit operatively coupled between the SONET input and output signal paths and configured to provide time division multiplexed connections for the input and output signals, wherein the SONET input signal path includes a pointer interpreter configured to interpret at least one input signal pointer serially coupled to a synchronization buffer configured to transfer the input signal from a respective clock rate of the SONET input signal path to a respective clock rate of the time slot interchange circuit, and wherein the SONET output signal path includes a pointer generator configured to generate at least one output signal pointer serially coupled to a first-in first-out buffer configured to transfer the output signal from the respective clock rate of the time slot interchange circuit to a respective clock rate of the SONET output signal path, wherein the input signal is an STS-M (M>1) signal, and the SONET input signal path further includes an alignment buffer operatively coupled between the synchronization buffer and the time slot interchange circuit and configured to perform column alignment on the STS-M signal, and wherein the alignment buffer includes a multitap delay element and a controller circuit, the multitap delay element having an input and a plurality of outputs and being configured to receive the STS-M signal at the input and provide increasingly delayed versions of the STS-M signal at successive ones of the outputs, the controller circuit being configured to select a delayed version of the STS-M signal from one of the outputs for application to the time slot interchange circuit.

6. The system of claim 1 wherein the at least one SONET input signal path comprises a plurality of SONET input signal paths and the at least one SONET output signal path comprises a plurality of SONET output signal paths, the number of SONET input signal paths being greater than the number of SONET output signal paths.

7. A SONET multiplexed communications system, comprising:

at least one SONET input signal path configured to receive at least one input signal, the SONET input signal path including a synchronization buffer;

at least one SONET output signal path configured to transmit at least one output signal corresponding to the input signal, the SONET output signal path including a pointer interpreter configured to interpret at least one input signal pointer, a pointer generator configured to generate at least one output signal pointer, and a first-in first-out buffer serially coupled between the pointer interpreter and the pointer generator; and at least one time slot interchange circuit operatively coupled between the synchronization buffer and the pointer interpreter included in the SONET input and output signal paths, respectively, the time slot interchange circuit being configured to provide time division multiplexed connections for the input and output signals, wherein the synchronization buffer included in the SONET input signal path is configured to transfer the input signal from a respective clock rate of the SONET input signal path to a respective clock rate of the time slot interchange circuit, and wherein the first-in first-out buffer included in the SONET output signal path is configured to transfer the output signal from the respective clock rate of the time slot interchange circuit to a respective clock rate of the SONET output signal path.

8. The system of claim 7 wherein the input signal is an STS-M (M>1) signal, and the SONET input signal path further includes an alignment buffer operatively coupled between the synchronization buffer and the time slot interchange circuit and configured to perform column alignment on the STS-M signal.

9. A SONET multiplexed communications system, comprising:

at least one SONET input signal path configured to receive at least one input signal;

at least one SONET output signal path configured to transmit at least one output signal corresponding to the input signal; and at least one time slot interchange circuit operatively coupled between the SONET input and output signal paths and configured to provide time division multiplexed connections for the input and output signals, wherein the SONET input signal path includes a synchronization buffer configured to transfer the input signal from a respective clock rate of the SONET input signal path to a respective clock rate of the time slot interchange circuit, and wherein the SONET output signal path includes a pointer interpreter configured to interpret at least one input signal pointer, a pointer generator configured to generate at least one output signal pointer, and a first-in first-out buffer serially coupled between the pointer interpreter and the pointer generator and configured to transfer the output signal from the respective clock rate of the time slot interchange circuit to a respective clock rate of the SONET output signal path, wherein the input signal is an STS-M (M>1) signal, and the SONET input signal path further includes an alignment buffer operatively coupled between the synchronization buffer and the time slot interchange circuit and configured to perform Column alignment on the STS-M signal, and wherein the alignment buffer includes a multitap delay element and a controller circuit, the multitap delay element having an input and a plurality of outputs and being configured to receive the STS-M signal at the input and provide increasingly delayed versions of the STS-M signal at successive ones of the outputs, the controller circuit being configured to select a delayed version of the STS-M signal from one of the outputs for application to the time slot interchange circuit.

10. The system of claim 7 wherein the at least one SONET input signal path comprises a plurality of SONET input signal paths and the at least one SONET output signal path comprises a plurality of SONET output signal paths, the number of SONET input signal paths being greater than the number of SONET output signal paths.

11. A method of operating a SONET multiplexed communications system, comprising the steps of:

providing at least one SONET input signal path including a pointer interpreter and a synchronization buffer serially coupled to the pointer interpreter;

providing at least one SONET output signal path including a pointer generator and a first-in first-out buffer serially coupled to the pointer generator;

providing a time slot interchange circuit operatively coupled between the pointer interpreter and the pointer generator included in the SONET input and output signal paths, respectively;

receiving at least one input signal by the SONET input signal path;

interpreting at least one input signal pointer by the pointer interpreter included in the SONET input signal path;

transferring the input signal from a respective clock rate of the SONET input signal path to a respective clock rate of the time slot interchange circuit by the synchronization buffer included in the SONET input signal path;

providing time division multiplexed connections for the input signal and at least one corresponding output signal by the time slot interchange circuit;

generating at least one output signal pointer by the pointer generator included in the SONET output signal path;

transferring the corresponding output signal from the respective clock rate of the time slot interchange circuit to a respective clock rate of the SONET output signal path by the first-in first-out buffer included in the SONET output signal path; and transmitting the corresponding output signal by the SONET output signal path.

12. The method of claim 11 further including the step of performing column alignment on the input signal by an alignment buffer included in the SONET input signal path.

* * * * *